Figure 4:
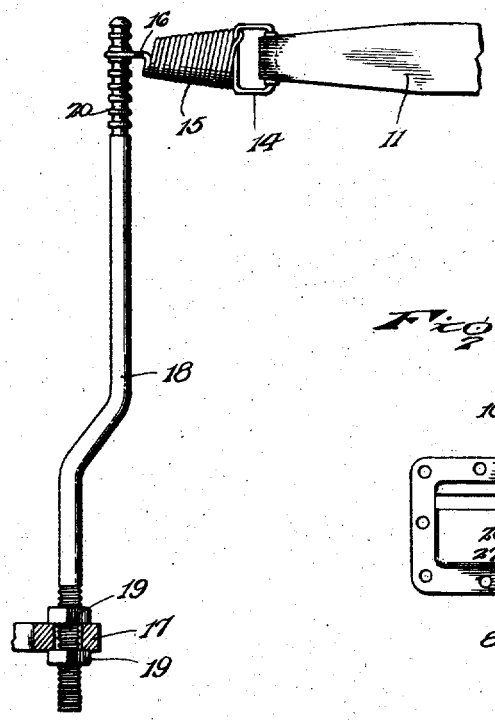

Jan. 8, 1924. Re. 15,742
J. ICKENROTH
HEADREST FOR MOTORISTS
Original Filed Feb. 4, 1922 2 Sheets-Sheet 1
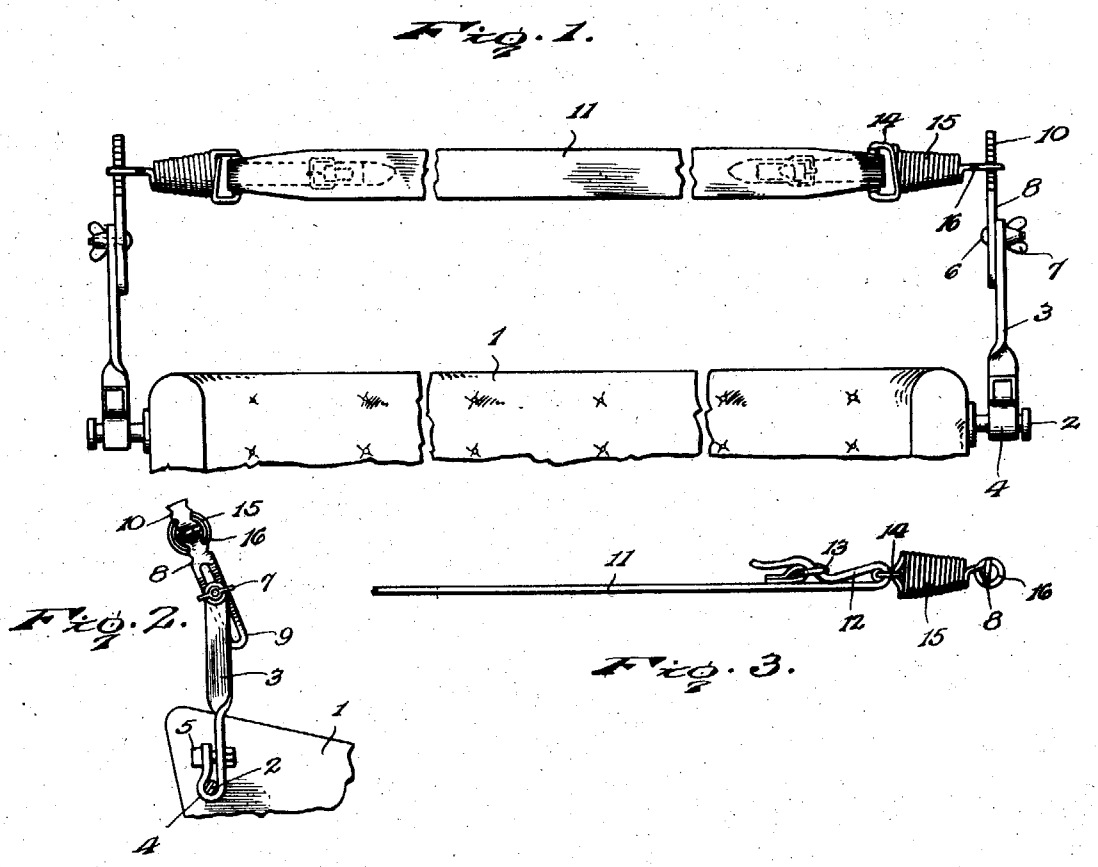
Inventor
JOHN ICKENROTH.
By Lacey & Lacey, Attorneys Jan. 8, 1924. Re. 15,742

J. ICKENROTH

HEADREST FOR MOTORISTS

Original Filed Feb. 4, 1922 2 Sheets-Sheet 2

Inventor
JOHN ICKENROTH.

By

Lacy & Lacy, Attorneys

Reissued Jan. 8, 1924. Re. 15,742

UNITED STATES PATENT OFFICE.

JOHN ICKENROTH, OF RICHMOND HEIGHTS, MISSOURI.

HEADREST FOR MOTORISTS.

Original No. 1,445,689, dated February 20, 1923, Serial No. 534,169, filed February 4, 1922. Application for reissue filed June 1, 1923. Serial No. 642,855.

*To all whom it may concern:*

Be it known that I, JOHN ICKENROTH, a citizen of the United States, residing at Richmond Heights, St. Louis County, in the State of Missouri, have invented certain new and useful Improvements in Headrests for Motorists, which is designed especially to be used in conjunction with automobile seats, and of which the following is a specification.

This invention relates to a headrest which is designed especially to be used in conjunction with automobile seats and has for its principal object to provide simple and efficient means upon which the head may be rested by the passengers in the automobile.

Another important object of the invention is to provide a device of this nature which is adjustable to accommodate persons of different heights by a simple and efficient vertical adjustment.

A still further object of the invention is to provide adjusting means so as to place the headrest in various positions for accommodating the various positions which a passenger might desire to take.

With the above and numerous other objects in view as will appear as the description progresses, the invention resides in certain novel features of construction, and the combination and arrangement of parts as will be hereinafter more fully described and claimed.

Figure 5:
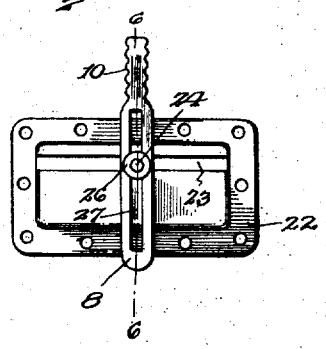
Figure 6:
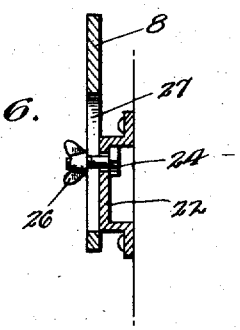

In the drawings:

Figure 1 is an elevation of one form of the headrest showing the same attached to the upper portion of an automobile seat, Fig. 2 is a side elevation of the device shown in Fig. 1, Fig. 3 is an edge view of the flexible member and one of its spring attaching devices, Fig. 4 is a fragmentary elevation of another form of the headrest, Fig. 5 is a similar view of another form of the holding means for the headrest, and Fig. 6 is a section taken on the line 6—6 of Fig. 5.

Referring to the drawings in detail and especially Figures 1 to 3 inclusive, it will be seen that 1 represents a seat of any preferred construction having the lugs 2 extending from its sides. The brackets 3 are attached to the lugs 2 and include the clamp portions 4 which envelop the lugs 2 and are held in firm engagement therewith by means of the bolts 5. This bracket 3 is twisted so that its upper portion extends in a plane at right angles to its lower portion and the upper end thereof is apertured so as to receive the bolt 6 which has thereon a thumb nut 7. The bracket bar 8 is provided with the elongated slot 9 at its lower end which receives the bolt 6 whereby this bracket bar may be held in various adjusted positions in relation to the bracket 3. The upper end of the bracket bar 8 is provided with a plurality of annular grooves or notches 10. The headrest proper consists of a flexible strap or like member 11 which is provided at its ends with tongues or similar elements 12 engageable with the buckles 13. These elements 12 are adapted to engage the loops 14 of the springs 15 which are provided at their outer ends with loops 16 for engaging the annular grooves or notches 10 It will, therefore, be readily seen that the flexible member 11 may be adjusted vertically in relation to the bracket bars 8 and that the bracket bars 8 may also be adjusted vertically in relation to the brackets 3 and may be in and out of alinement at various angles therewith as may be found desirable. The rest member 11 may thus be easily set at any desired height above the back of the seat and also set in advance or in rear of the vertical plane of the back of the seat so as to support the head of the user in such position as may prove most comfortable under any conditions.

Referring to the structure disclosed in Figure 4, it will be seen that any suitable apertured bracket 17 is attached to the seat and a bracket bar 18 is passed through its aperture and held in place by the nuts 19 whereby the bracket bar may be adjusted vertically. The upper end of the bracket bar 18 is provided with the series of annular grooves or notches 20 for receiving the loops 16 of the springs 15. It will be readily noted that the nuts 19 are mounted on the threaded lower portion of the bracket bar 18 and may be turned home against the upper and lower sides of the bracket 17 so as to firmly secure the bar 18 in any position of vertical adjustment. It will also be noted that the bar 18 is offset at a point between its ends and that its diameter is less than the diameter of the aperture through the bracket 17. This construction and arrangement permits front and rear adjustment of the head-supporting member 11, which is effected by rotating the bar 18 about its longitudinal axis while the nuts 19 are slightly loosened, as will be readily understood. The remaining portions of the device will be the same as those described in connection with the previously described structure.

Referring to the device shown in Figure 5, it will be seen that a bracket or base plate 22 is provided having therein a horizontal slot 23 through which passes the bolt 24 provided with a thumb nut 26. This bolt 24 also passes through a slot 27 in the lower portion of the bracket bar 8 which is provided at its upper end portion with the annular notches or grooves 10 for receiving the loops 14 as is disclosed to advantage in Figure 1. The bracket or base plate 22 is secured to the side of the vehicle top above the seat, and may be employed on either closed or open cars. The slots 23 and 27 provide for both vertical and front to rear adjustment of the bracket bar 8 and the single bolt 24 with its nut 26 effectually secures said bar in any position in which it may be set. In all the forms of the invention, the head-supporting member may be adjusted vertically relative to the bracket bars by engagaing the loops 16 in proper notches 10. One end of the head-supporting strap 11 may by this means be set higher than the other end thereof, as is frequently desirable, and, if the headrest is not to be used, the loops 16 may be easily lifted from the supporting brackets without requiring removal of the brackets which will not interfere in any way with the comfort of the occupants of the seat nor detract from the sightliness of the vehicle.

My device may be readily applied to any vehicle without the services of a skilled mechanic, and, when applied, will support the head of the user comfortably and free of shocks and jars. It is very desirable as an aid to the comfort of invalids or ailing persons but does not reduce the capacity of the seat nor prevent the use thereof in the customary manner. Moreover, the device is supported above and free of the back of the seat and does not mar nor injure the upholstery thereof in the slightest degree.

I have described my invention with some degree of particularity in connection with my preferred embodiment thereof but it is to be understood that numerous changes in form, and in the combination and arrangement of parts may be resorted to without departing from the spirit of the invention as hereinafter claimed.

Having thus described my invention, what I claim as new is:

1. In combination, a headrest, a pair of brackets for said headrest each of which consists of a bracket bar provided at its upper end with a series of annular notches, loops for engaging said notches, springs on said loops engaging the ends of said headrest, and means for attaching the bars to a seat in the manner and for the purpose specified.

2. A headrest for vehicle seats comprising supporting devices mounted at fixed points adjacent the ends and back of the seat and including bracket bars rising above and free of the ends and back of the seat and provided with series of notches in their upper end portions, a flexible head-supporting member disposed between the upper ends of said bracket bars, and elastic members carried by the ends of the head-supporting member and freely engageable in the notches in the bracket bars.

3. A headrest for vehicle seats comprising supporting members having means adapting them to be secured to fixed parts at approximately the ends of the back of the seat, each of said members having an upstanding part provided with a longitudinally extending series of seats, a flexible and longitudinally yieldably extensible head-supporting member extending between the first mentioned members, and means at each end of the said head-supporting member loosely engaged with the upstanding part of a respective one of the said first mentioned members and interchangeably with the seats thereof and freely adjustable vertically therealong whereby the opposite end portions of the head-supporting member may be caused to assume relatively different elevated positions.

4. A headrest for vehicle seats comprising supporting members having means adapting them to be secured to fixed parts approximately at the ends of the back of the seat, each of said members having an upstanding part provided with a longitudinally extending series of seats, a flexible and longitudinally yieldably extensible head-supporting member extending between the first mentioned members, and loops at the ends of the said head-supporting member loosely engaged with the upstanding parts of the respective ones of the first mentioned members and movably and interchangeably engaged in the seats thereof and adjustable vertically thereon whereby the opposite end portions of the head-supporting member may be caused to assume relatively different elevated positions.

In testimony whereof, I hereto set my hand.

JOHN ICKENROTH. [L. S.]